(12) United States Patent
Lindler et al.

(10) Patent No.: US 6,526,864 B2
(45) Date of Patent: Mar. 4, 2003

(54) PIEZOELECTRICALLY ACTUATED SINGLE-STAGE SERVOVALVE

(75) Inventors: Jason E. Lindler, Mountain View, CA (US); Eric H. Anderson, Mountain View, CA (US)

(73) Assignee: CSA Engineering, Inc., Mountain View, CA (US)

( * ) Notice: Subject to any disclaimer, the term of this patent is extended or adjusted under 35 U.S.C. 154(b) by 0 days.

(21) Appl. No.: 09/836,698

(22) Filed: Apr. 17, 2001

(65) Prior Publication Data

US 2002/0148518 A1 Oct. 17, 2002

(51) Int. Cl.$^7$ .............................................. F15B 13/044
(52) U.S. Cl. ..................... 91/459; 137/1; 137/625.65; 251/129.06
(58) Field of Search ................ 137/625.65, 1; 251/129.06; 91/459

(56) References Cited

U.S. PATENT DOCUMENTS

| | | | |
|---|---|---|---|
| 3,000,363 A | * 9/1961 | Hayner et al. | 137/625.64 |
| 3,411,411 A | * 11/1968 | Fleck et al. | 91/459 |
| 3,550,631 A | * 12/1970 | Vanderlaan et al. | 137/625.65 |
| 3,643,699 A | * 2/1972 | Mason | 137/625.64 |
| 4,175,587 A | * 11/1979 | Chadwick et al. | 137/625.65 |
| 4,907,615 A | 3/1990 | Meyer et al. | |
| 5,040,568 A | 8/1991 | Hair et al. | |
| 5,085,125 A | * 2/1992 | Emo et al. | 251/129.06 |
| 5,148,735 A | 9/1992 | Veletoyac | |
| 5,148,833 A | * 9/1992 | Ota | 251/129.06 |
| 5,267,589 A | 12/1993 | Watanabe | |
| 5,285,715 A | * 2/1994 | Elrod et al. | 137/625.65 |
| 5,740,969 A | 4/1998 | Hoffmann et al. | |
| 6,017,016 A | 1/2000 | Jackson | |
| 6,170,526 B1 | 1/2001 | O'Neill | |
| 6,202,670 B1 | 3/2001 | O'Neill | |

OTHER PUBLICATIONS

Rogers, Craig A., Smart Materials Structures and Mathematical Issues, Sep. 15–16, 1988.
Smart Materials and Structures, vol. 1 No. 1, Mar. 1992, Foreward by Richard O. Claus et al.
Ouellette, Jennifer, 'How Smart are Smart Materials?', The Industrial Physicist, Dec. 1996.
Intellimat, Welcome to the World of Smart Materials, Internet web–site www.intellimat.com.

* cited by examiner

Primary Examiner—Gerald A. Michalsky
(74) Attorney, Agent, or Firm—Rick G. Brewster (57) ABSTRACT

The invention disclosed is a direct driven, smart material actuated servovalve providing very high actuation control bandwidth for moderate to large flow systems. The servovalve is comprised of a valve body and a valve spool, a smart material element such as a piezoelectric, electrostrictive or magnetostrictive material, and a mechanical lever. The lever is mounted to a pivot support in the valve body and is positioned relative to the smart material element and valve spool such that expansion/contraction motion induced into the smart material element enforces motion on the first end of the mechanical lever. This motion is amplified by the lever at the second end of the lever and drives the end of the valve spool. The resulting amplified motion causes the valve spool to shift along its longitudinal axis of sufficient distance to afford high bandwidth valve spool positioning on large flow valves. Localized spool position sensing and control electronics are further added to provide a self-contained, high bandwidth servovalve.

13 Claims, 6 Drawing Sheets

PIEZOELECTRICALLY ACTUATED SINGLE-STAGE SERVOVALVE

STATEMENT REGARDING FEDERALLY SPONSORED RESEARCH

This invention was made with U.S. Government support under SBIR Contract No. F-08630-00-C-0058 awarded by the Department of the Air Force. The U.S. Government has certain royalty-free rights in this invention.

BACKGROUND OF THE INVENTION

The present invention relates to servohydraulic actuators. More particularly, the present invention pertains to a piezoelectric direct driven servovalve capable of very high bandwidth operation.

For many high load systems hydraulic actuators have remained a necessary and desirable means of device actuation. The control of these actuators is commonly effected through the application of various types of servovalves. In most servovalves a mechanical or electrical signal is utilized to direct the position of a valve spool within a valve housing. The position of the valve spool within the housing determines the flow path(s) between valve ports to direct flow to the ports of a hydraulic actuator thus determining the direction of force application and motion of the actuator.

The need for higher frequency, more precise control of structures and devices has led to ever improving servovalves and systems. Servovalves have evolved from relatively slow acting two stage devices where the first stage is comprised of a pilot valve. The pilot valve is controlled by some low power means such as human force input or a low power electrical signal and shuttles a pressurized fluid or gas supply in a pilot system which thereby displaces a valve spool in a larger flow, power control valve. The power control valve in turn determines the flow direction to a high force, large displacement actuator. The compliance and inertia in the hardware used for pilot valve operation and the compliance and fluid inertia in the pilot fluid system combine to significantly reduce the frequency response of the power control valve to the original system command input.

The need for faster acting systems has led to the development of various single-stage control valves where a single, directly controlled system or device develops the force necessary to shuttle the valve spool in the flow control valve governing the high force actuator.

Substantial increases in control speed and available system bandwidth have been gained through the application of electromagnetic motors. With electrical amplification of the command signal, an electronic amplifier and electromagnetic motor or actuator directly control the position of the servovalve spool. The force available from the electromagnetic device is utilized to directly drive and position the spool, thus supplanting the pilot valve and pilot pressure system formerly used for power valve actuation.

An example of such a system is disclosed in U.S. Pat. No. 5,040,568. In that patent the rotary motion of an electromagnetic motor is applied directly to the spool of a power valve to effect valve control in a directly driven, single-stage manner. The size of the power valve and the magnitude of the power system pressure being controlled determine the amount of valve spool force necessary for valve control, which thereby determines the size of the electromagnetic motor necessary for spool positioning. A significant disadvantage of the use of electromagnetic motors for servovalve actuation is the relatively weak force and energy density of these drives which limits the size and bandwidth of the servovalve. As the electromagnetic motor size increases, performance frequency drops and system control bandwidth becomes limited by the inherent characteristics and performance capabilities of the motor.

In an alternative approach for gaining system control bandwidth, smart materials, such as piezoelectric, electrostrictive, and magnetostrictive materials, have been employed in valve control systems. With smart materials large forces can be generated for very small distances and controlled at very high frequencies.

In U.S. Pat. No. 5,148,735 a piezoelectric or magnetostrictive element operates as the actuation means to valves controlling the fluid in a pilot fluid system. In this approach the smart material elements in combination with the pilot fluid controlling valves act as a pilot valve to a pilot system so to directly control the fluid pressure applied to the ends of the power valve spool. The approach maintains the compliance and inertia of the pilot system, however, which reduces the bandwidth capability inherent to the smart material element.

The use of a piezoelectric element to directly control the position and movement of a valve spool is disclosed in U.S. Pat. No. 6,170,526 B1. In that patent a piezoelectric actuator controls the position of a poppet valve within its valve body. In that patent the poppet valve change in position is equal or comparable to the change in length of the piezoelectric element, which being very small causes the available valve motion to be very small. The small amount of valve movement afforded severely limits the size of the valve and the flow which can be regulated.

There is a need for a high bandwidth servovalve with frequency response substantially beyond that available from electromagnetic actuated valves which is also suitable for substantially larger flow capability than that afforded by the present smart material actuated valves. The invention described herein provides for such a servovalve.

BRIEF SUMMARY OF THE INVENTION

The invention disclosed is a direct driven, smart material actuated servovalve having substantially increased actuation control bandwidth relative to comparably sized flow valves available in the prior art and thereby is suitable for use in moderate to large flow systems as a single-stage servovalve.

The invention incorporates smart materials, with a preferred embodiment employing piezoelectric materials, to directly drive the spool in a power control servovalve. The achieved control bandwidth is two to five times higher than that achieved by comparably sized valves employing electromagnetic drives. The invention also provides for a package that is more compact and lightweight than servovalves of comparable size.

The invention utilizes the high force, high frequency response characteristics of a smart material element and applies this actuation capability directly to the servovalve spool and without an intermediate pilot fluid system. An embodiment of the invention comprises a valve body with a valve spool having a longitudinal axis, a smart material element, and a mechanical lever. The mechanical lever is mounted to a pivot support means and is positioned relative to the smart material element and valve spool such that expansive motion induced into the smart material element enforces motion on the first end of the mechanical lever which motion is thereby amplified by the lever at the second end of the lever. The second end drives the end of the valve spool thus causing the valve spool to shift along its longitudinal axis an amplified distance commensurate with the expansion and contraction of the smart material element.

The positioning of the smart material element relative to the valve spool is maintained in a compact form such that the mechanical lever is kept as small and stiff as possible to minimize the compliance and mass of the lever and thus maintain the high bandwidth control capability of the smart material element.

The invention also serves as a method for effecting high bandwidth control of a servovalve. An embodiment of the method is comprised of inducing a shape change into a smart material element, mechanically amplifying a component of motion of the shape change of the smart material element, applying the mechanically amplified component of motion directly to the end of the valve spool such that the spool is caused to shift to a different valve spool position, and varying the induced shape change in the smart material in a controlled manner such that the valve spool is forced to shift between valve positions in a commensurate controlled manner.

BRIEF DESCRIPTION OF THE DRAWINGS

The operation of this invention can be best visualized by reference to the following drawings described below.

DETAILED DESCRIPTION OF THE INVENTION

Described in detail below is an apparatus and method for effecting a single-stage servovalve suitable for moderate to large flow volumes with an actuation control bandwidth substantially higher than that available from comparable flow valves in the prior art. In the following description, for purposes of explanation, numerous specific details are set forth in order to provide a thorough understanding of the present invention. It will be obvious, however, to one skilled in the art that the present invention may be practiced without these specific details. In other instances, well-known structures and devices are shown in simplified form in order to avoid obscuring the present invention.

In general the invention incorporates smart materials for driving the valve spool of a servovalve (also referred to as a power control valve) with a preferred embodiment employing piezoelectric materials. The invention achieves a control bandwidth that is two to five times higher than that achieved by comparably sized valves employing electromagnetic drives. The invention also provides a package that is more compact and lightweight than servovalves of comparable size.

Figure 1:
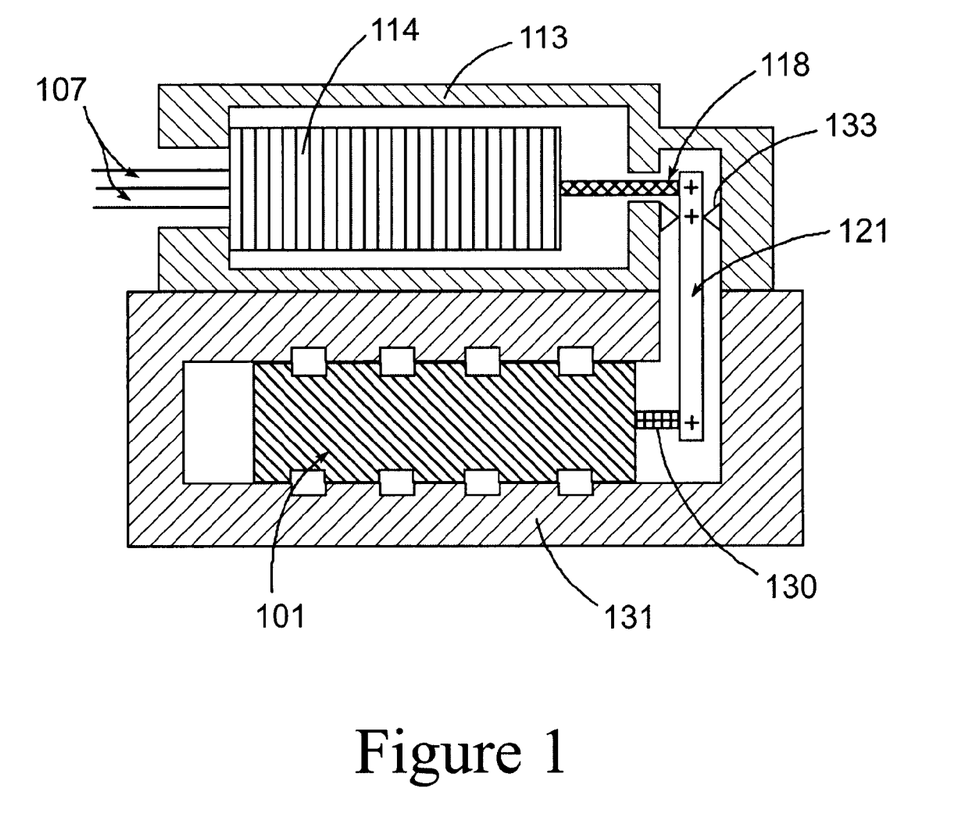
FIG. 1 is a cross section view of an example smart material direct driven servovalve in accordance with an embodiment of the invention.

FIG. 1 shows a cross section view of a conceptual level example smart material element direct driven servovalve in accordance with an embodiment of the invention. It provides substantially increased actuation control bandwidth relative to comparably sized flow valves available in the prior art. The invention utilizes the high force, high frequency response characteristics of smart materials and applies this actuation capability directly to the servovalve spool and without an intermediate pilot fluid system.

The embodiment shown in FIG. 1 is comprised primarily of a valve body 131 with a valve spool 101 having a longitudinal axis, a smart material element 114, and a mechanical lever 121. The mechanical lever 121 is mounted to a pivot support means 133 and is positioned relative to the smart material element 114 and valve spool 101 such that expansive motion induced into the smart material element 114 enforces motion on the first end of the mechanical lever 121 which motion is thereby amplified at the second end of the lever. The second end drives the end of the valve spool 101 thus causing the valve spool to shift along its longitudinal axis an amplified distance commensurate with the expansion and contraction of the smart material element 114.

In the embodiment the positioning of the smart material element 114 relative to the valve spool 101 is maintained in a compact form by a servo housing 113 that is attached directly to the valve body 131 such that the mechanical lever 121 is kept as small and stiff as possible to minimize the compliance and mass of the lever and thus maintain the high bandwidth control capability of the smart material element 114.

In the embodiment of FIG. 1 a link 118 connects the smart material element 114 to the mechanical lever 121, and a second link 130 connects the lever 121 to the valve spool 101. This manner of connection allows for minimized side loading of the valve spool 101 during valve actuation. Additionally shown in FIG. 1 are wires 107 which provide the command voltage to the smart material element 114.

Figure 2:
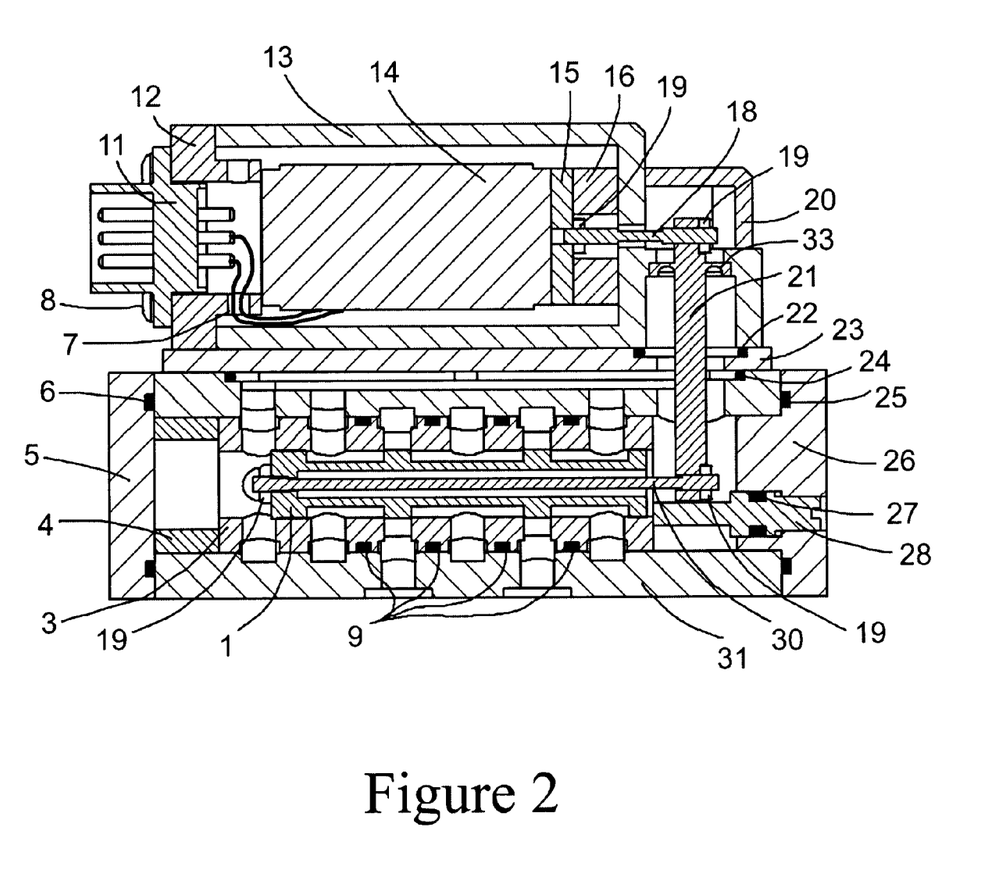
FIG. 2 is a cross section view of a detailed piezoelectric direct driven servovalve in accordance with an embodiment of the invention.

FIG. 2 shows the cross section view of a detailed piezoelectric direct driven servovalve having additional advantageous features in accordance with an embodiment of the invention.

In FIG. 2 spool 1 is encased in a sleeve 3 which in turn is encased in the main housing 31. Sleeve 3 may be axially positioned in main housing 31 by turning sleeve positioning screw 28 which preloads the sleeve 3 against sleeve preload spring 4. This sleeve positioning allows the valve porting to be fine tuned to the spool position rather than requiring the valve spool to be positioned relative to the port position. Left end cap 5 and right end cap 26 close out the ends of the main housing 31 and a fluid tight seal is assured through use of o-ring seals 6 and 25. Main housing cover 23 closes out the top of the main housing 31 with O-ring seal 24. Sleeve O-ring seals 9 act to prevent cross port flow from occurring between the sleeve 3 and main housing 31. O-ring 27 provides for sealing around the sleeve positioning screw 28 within right end cap 26.

Mounted to main housing 31 is servo housing 13 which supports piezoelectric stack 14 at the piezoelectric cap 12. Piezoelectric wires 7 pass through connector 11 for application of the command signal. Piezoelectric stack 14 is additionally attached with connector 15 to piezoelectric preload spring 16 which preloads piezoelectric stack 14 against the cap 12 and servo housing 13. Stack linkage 18 connects piezoelectric stack 14 to one end of mechanical lever 21 which is supported by pivot mount 33 which is attached to servo housing 13. Lever 21 passes through aligned holes in servo housing 13 and main housing 31 to connect at its other end to spool linkage 30 which in turn attaches to spool 1. Spool linkage 30 is shown, as depicted in the embodiment of FIG. 2, to pass through the center of spool 1 and attach to the far end of spool 1 relative to lever 21. This manner of connection allows for minimized side loading of the valve spool 1 during valve actuation. Nuts 19 connect the stack linkage 18, lever 21, and spool linkage 30 together and to spool 1 and stack 14 so to prevent backlash between these elements.

Additional elements of the embodiment of FIG. 2 include a lever cover 20 and servo housing o-ring 22 for excluding dirt and moisture from the linkage elements. Connector screws 8 assure the attachment of electrical connector 11 to piezoelectric cap 12.

Figure 3:
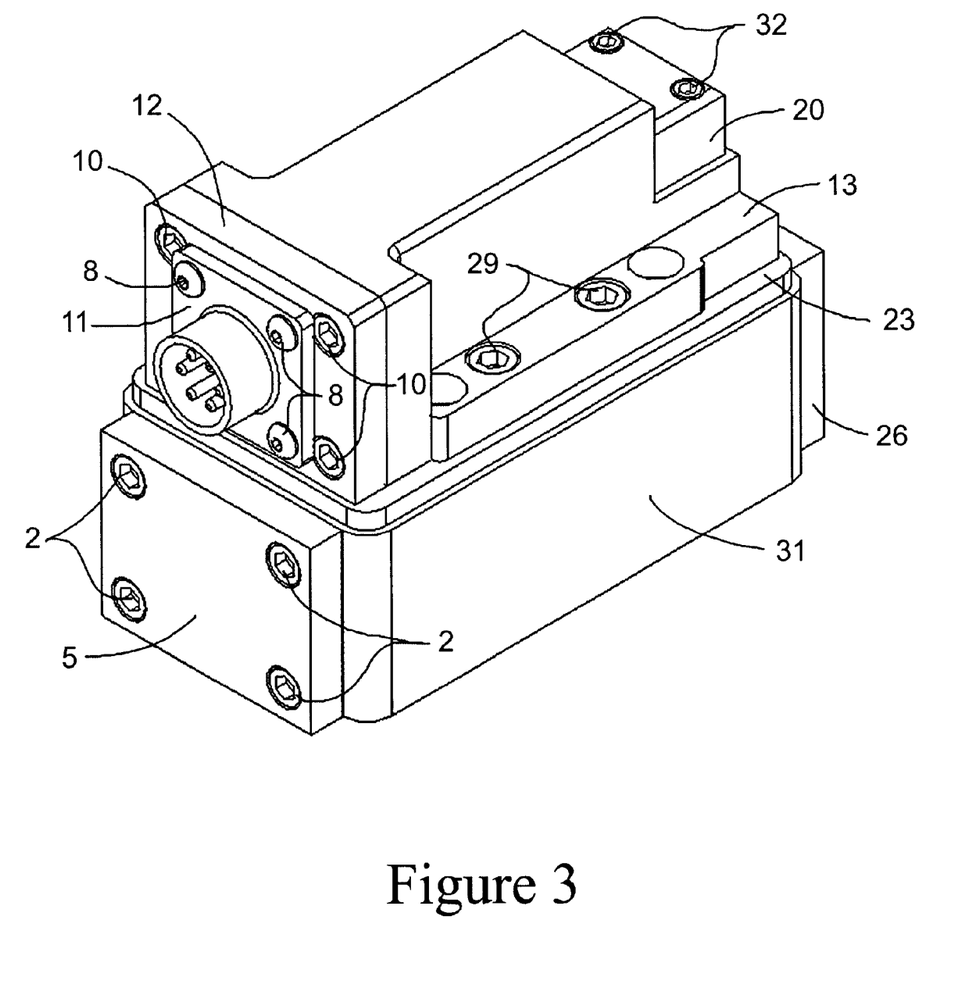
FIG. 3 is an isometric view of the detailed servovalve depicted in FIG. 2 in accordance with an embodiment of the invention.

FIG. 3 shows an isometric view of the servovalve package of FIG. 2. Servo housing 13 is attached to the main housing 31 at the main housing cover 23 by servo housing screws 29. Lever cover 20 is attached to servo housing 13 by lever cover screws 32. Piezoelectric cap 12 is attached to servo housing 13 with screws 10 and end caps 5 and 26 are attached to main housing 31 with housing screws 2.

An additional advantage of the embodiment described in FIGS. 2 and 3 is that the transfer of motion through the mechanical lever allows for isolation of the smart material element from the fluid resevoir of the valve body. Another advantage to the embodiment shown in FIGS. 2 and 3 is that the mechanical lever is positioned perpendicular to the valve spool so to prevent a pressure bias on the lever from being transferred as a force component to the end of the valve spool.

In additional embodiments the pivot means for supporting the mechanical lever includes a pin, a roller bearing, a ball and/or a knife edge element. Additionally the servo housing and main housing may be integrated into a single housing.

Figure 4:
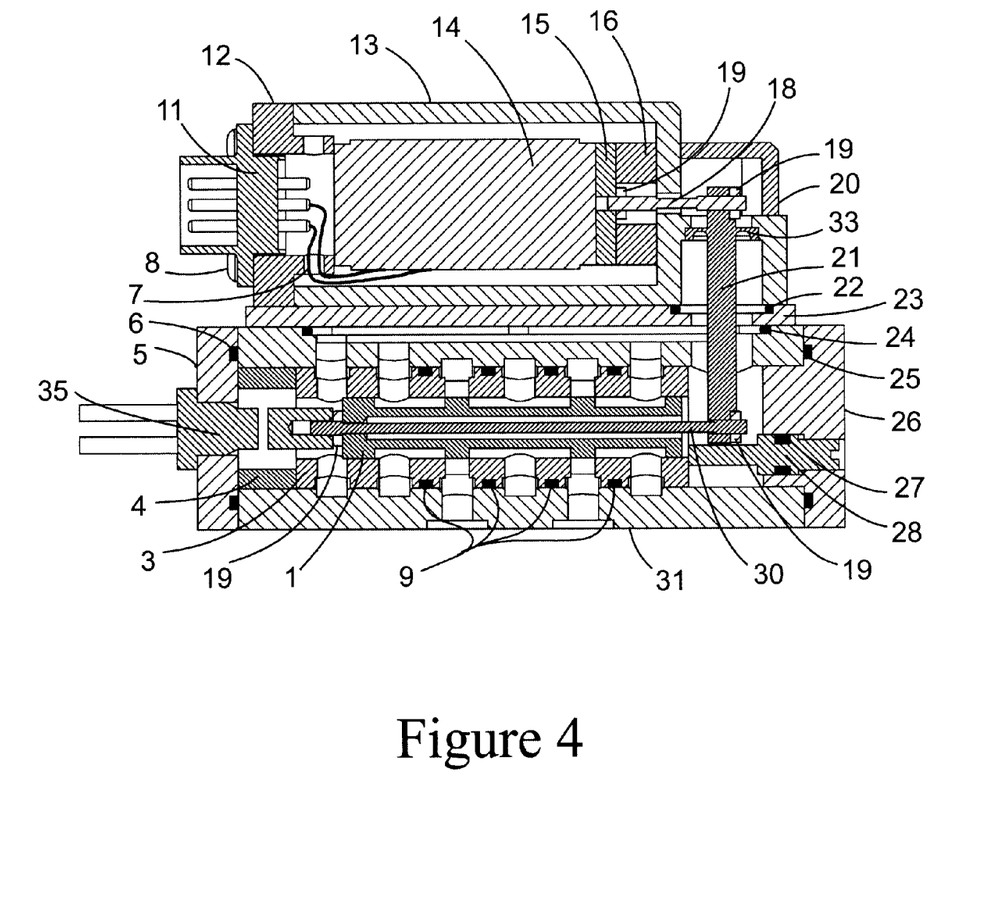
FIG. 4 is a cross section view of a detailed piezoelectric direct driven servovalve including a spool state variable sensor in accordance with an embodiment of the invention.

In another embodiment, as shown in FIG. 4, the servovalve further comprises at least one spool state variable sensor 35 for providing spool state variable data for spool feedback control. Spool state variables are inclusive of position, velocity and acceleration.

In a further embodiment of the device, the servovalve incorporates integrated electronics for providing local feedback control of the servovalve.

In an additional embodiment the valve body and valve spool are of a design for effecting pressure modulation such that the servovalve effects a pressure control valve.

Figure 5:
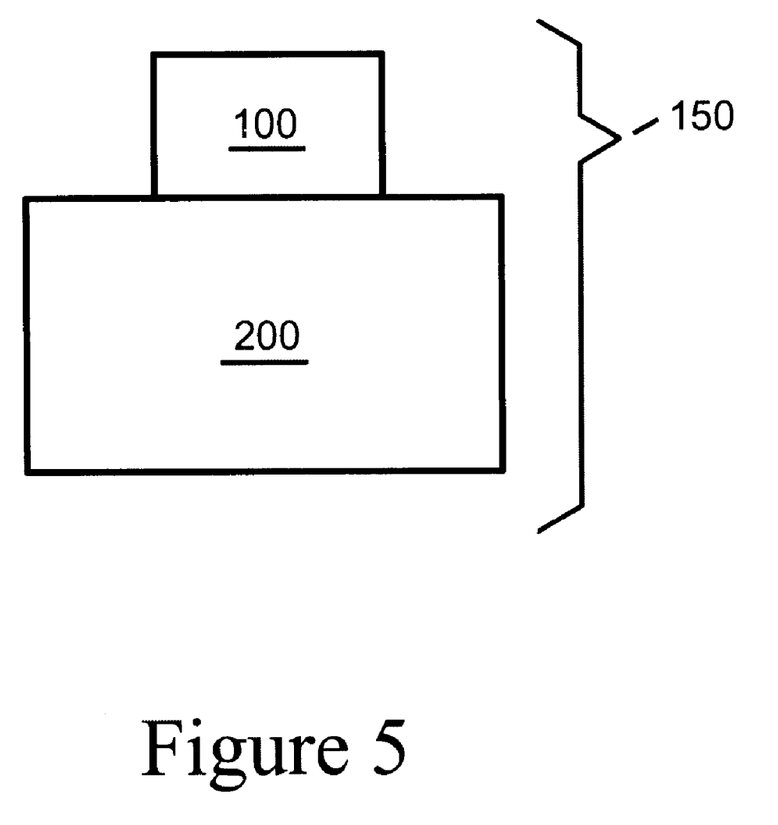
FIG. 5 is a block diagram depicting a two-stage servovalve incorporating a piezoelectric direct driven servovalve in accordance with an embodiment of the invention.

In an additional embodiment, as shown in FIG. 5, a two-stage servovalve 150 suitable for controlling very large flows is effected by a first servovalve 100 being attached to a second servovalve 200 such that fluid flow from the first servovalve controls the spool position of the second servovalve which in turn can be used to control the flow of a very large flow system or actuator.

In an additional embodiment, two single-stage piezoelectric servovalves are arranged in a parallel flow fashion upon a single system or actuator for providing doubled flow capacity with little or no loss of bandwidth performance.

Figure 6:
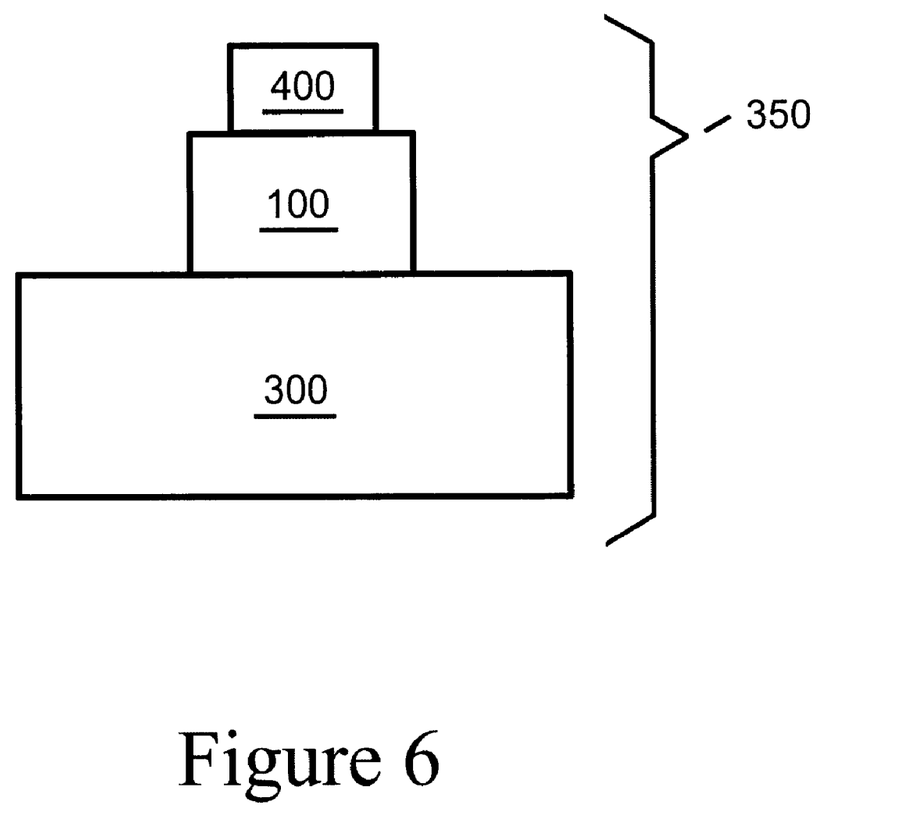
FIG. 6 is a block diagram depicting a high bandwidth motion control system utilizing a piezoelectric direct driven servovalve in accordance with an embodiment of the invention.

The invention also serves as a system for effecting high bandwidth motion control as shown in block diagram form in FIG. 6. The system 350 is comprised of a smart material element driven servovalve 100, a hydraulic actuator 300, and a computer controlled variable voltage source 400. In the system embodiment, the servovalve 100 comprises a valve actuator which is further comprised of a mechanical lever mounted within a valve actuator body such that expansion motion of the smart material element is constrained by the valve actuator body to be applied to one end of the mechanical lever thereby effecting a motion at the other end of the lever that is an amplified form of the expansion motion of the smart material element. The smart material element is comprised of a piezoelectric, electrostrictive, and/or magnetostrictive material. In the embodiment shown in FIG. 6, the computer controlled variable voltage source 400 is comprised of integrated electronics for providing local feedback control of the servovalve.

In a further embodiment of the invention as a system, the system is further comprised of at least one spool state variable sensor and a local electronic processor for providing servovalve local feedback control.

The invention also serves as a method for effecting high bandwidth control of a servovalve. An embodiment of the method is comprised of inducing a shape change into a smart material element, mechanically amplifying a component of motion of the shape change of the smart material element, applying the mechanically amplified component of motion directly to the end of the valve spool in the servovalve such that the spool is caused to shift to a different valve spool position, and then varying the induced shape change in the smart material element in a controlled manner such that the valve spool is forced to shift between valve positions in a commensurate controlled manner.

In a further embodiment, the method provides for local feedback control through the additional steps of monitoring the spool position or other state variable and providing this monitored data to a control system.

Hence, a smart material actuated servovalve suitable for single-stage control of moderate to large flow volumes with an actuation control bandwidth over twice that of comparable flow valves available in the prior art is disclosed. The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be pre-defined by the claims appended hereto and their equivalents.

What is claimed is:

1. A direct drive servovalve comprising:
   a valve body,
   a valve spool having a longitudinal axis,
   a sleeve,
   a smart material element, and
   a mechanical lever having first and second ends wherein the lever is mounted to a pivot support means and the lever is positioned relative to the smart material element and valve spool such that expansive motion induced into the smart material element enforces motion on the first end of the mechanical lever such that the first end motion is amplified by the lever at the second end of the lever and the second end of the lever drives a spool linkage which in turn drives the end of the valve spool causing the valve spool to shift along its longitudinal axis a distance commensurate with the amplified motion of the second end of the lever, wherein the spool linkage passes through the center of the valve spool and attaches to the far end of the valve spool relative to the mechanical lever, and wherein the sleeve surrounds the valve spool and nests within the valve body and the sleeve is longitudinally positionable relative to the valve spool such that the smart material element determines the valve spool position through the mechanical lever and wherein fine tuning of the relative position of the valve spool to the valve body porting is performed by positioning of the sleeve relative to the valve spool.

2. The servovalve of claim 1 wherein the smart material element is comprised of a piezoelectric stack.

3. The servovalve of claim 1 wherein the smart material element is comprised of at least one element chosen from electrostrictive and magnetostrictive elements.

4. The servovalve of claim 1 wherein the smart material element is integrally supported by the valve body and the pivot support means is mounted within the valve body.

5. The servovalve of claim 1 wherein the smart material element and the mechanical lever are mounted in a valve actuator body separate from the valve body.

6. The servovalve of claim 1 further comprising a sleeve adjustment screw supported by the valve body and positioned so to allow longitudinal positioning of the sleeve relative to the valve spool, and a sleeve preload spring positioned between the valve body and one end of the sleeve for providing longitudinal constraining force on the sleeve.

7. The servovalve of claim 1 wherein the valve body and valve effect pressure modulation such that the servovalve effects a pressure control valve.

8. The servovalve of claim 1 further comprising at least one spool state variable sensor for providing spool state variable data for spool feedback control.

9. A two-stage servovalve suitable for controlling large flows comprising a first servovalve of claim 1 and a second servovalve wherein the first servovalve is attached to the second servovalve such that fluid flow from the first servovalve controls the spool position of the second servovalve.

10. A system for effecting high bandwidth motion control comprising:

at least one servovalve of claim 1, a hydraulic actuator, and a computer controlled variable voltage source, wherein the servovalve regulates the fluid flow to the hydraulic actuator and the computer controlled variable voltage source provides voltage command input to the servovalve.

11. The system of claim 10 further comprising at least one spool state variable sensor and wherein the computer controlled variable voltage source is comprised of a local electronic processor for providing servovalve localized feedback control.

12. A method for effecting high bandwidth control of a servovalve having a valve comprising the steps of:

a) inducing a shape change into a smart material element, b) applying the shape change of the smart material element to a first end of a mechanical lever such that a second end of the lever has motion in amplified proportion to the shape change of the smart material element, c) applying motion of the second end of the lever to a spool linkage passing through the center of the valve spool to the far end of the valve spool such that the spool is caused to shift from a first valve spool position to a second valve spool position with minimal valve spool side loading, c2) positioning a sleeve relative to the valve spool to effect fine positioning of valve porting relative to the valve spool when the valve spool is in the second valve spool position, and d) varying the induced shape change in the smart material in a controlled manner such that the valve spool is forced to shift between valve positions in a commensurate manner.

13. The method of claim 12 wherein the smart material element is comprised of a piezoelectric stack and the step of inducing a shape change is comprised of applying an electric voltage to the piezoelectric stack such that an expansion of the piezoelectric stack is effected.

* * * * *